(12) United States Patent
Kossak

(10) Patent No.: US 7,708,234 B2
(45) Date of Patent: May 4, 2010

(54) COMMON BONDING NETWORK CLAMP

(75) Inventor: Robert W Kossak, Lemont, IL (US)

(73) Assignee: Panduit Corp., Tinley Park, IL (US)

( * ) Notice: Subject to any disclaimer, the term of this patent is extended or adjusted under 35 U.S.C. 154(b) by 14 days.

(21) Appl. No.: 12/056,601

(22) Filed: Mar. 27, 2008

(65) Prior Publication Data

US 2008/0217491 A1    Sep. 11, 2008

Related U.S. Application Data

(63) Continuation-in-part of application No. 12/044,005, filed on Mar. 7, 2008.

(60) Provisional application No. 60/893,713, filed on Mar. 8, 2007.

(51) Int. Cl.
*F16L 3/00* (2006.01)

(52) U.S. Cl. .................... 248/49; 248/74.1; 248/229.23; 248/230.4; 248/231.51

(58) Field of Classification Search ........... 248/74.1, 248/49, 229.13, 229.23, 228.4, 230.4, 231.51; 411/366.1, 914; 403/390; 439/779; 52/126.2, 52/220.5, 263
See application file for complete search history.

(56) References Cited

U.S. PATENT DOCUMENTS

| | | | |
|---|---|---|---|
| 1,873,559 A | 8/1932 | Dibner | |
| 2,137,834 A | 11/1938 | Dibner | |
| 2,180,931 A | 11/1939 | Rogoff | |
| 2,450,158 A | 9/1948 | Pennell | |
| 2,597,037 A | 5/1952 | Runde | |
| 2,830,353 A | 4/1958 | Barlow | |
| 2,885,776 A * | 5/1959 | Pellier | ................... 29/417 |
| 3,340,581 A * | 9/1967 | Engman et al. | ............. 24/276 |
| 3,423,113 A * | 1/1969 | Dosso et al. | ................ 403/217 |
| 3,633,254 A * | 1/1972 | Hoglund et al. | .............. 24/276 |
| 3,652,780 A * | 3/1972 | Wilson | ..................... 174/45 R |
| 3,901,577 A * | 8/1975 | Philibert et al. | ............ 439/804 |
| 3,913,188 A * | 10/1975 | Grassi | ........................ 24/276 |
| 3,943,817 A | 3/1976 | Mess | |
| 4,079,481 A | 3/1978 | Cacicedo | |
| 4,114,977 A | 9/1978 | Polidori | |
| 4,147,446 A | 4/1979 | Frank, Jr. | |

(Continued)

FOREIGN PATENT DOCUMENTS

EP    0871244 A2    10/1998

*Primary Examiner*—Korie Chan
(74) *Attorney, Agent, or Firm*—Robert A. McCann; Christopher S. Clancy; Aimee E. McVady

(57) ABSTRACT

A clamp used to create a bond between under floor wiring systems and a common bonding network is disclosed. The clamp includes a mounting bracket, a J-bolt and a split bolt for securing wires to the mounting bracket. The mounting bracket has a main body with an aperture and a slot. The J-bolt has a first end and a second end. The first end of the J-bolt is attached at the aperture of the mounting bracket and the second end of the J-bolt is positioned within the slot of the mounting bracket. The second end of the J-bolt is removed from the slot to enable the second end of the J-bolt to pivot away from the mounting bracket enabling the J-bolt to engage a floor pedestal.

6 Claims, 17 Drawing Sheets

U.S. PATENT DOCUMENTS

| | | | |
|---|---|---|---|
| 4,405,827 A | 9/1983 | Mixon, Jr. | |
| 4,575,985 A * | 3/1986 | Eckenrodt | 52/677 |
| 4,863,390 A | 9/1989 | Cera et al. | |
| 4,911,572 A | 3/1990 | Williams | |
| 4,915,653 A | 4/1990 | Mair | |
| 4,976,627 A * | 12/1990 | O'Loughlin | 439/100 |
| 5,151,560 A | 9/1992 | Kreinberg et al. | |
| 5,152,701 A | 10/1992 | Polidori | |
| 5,236,377 A | 8/1993 | Goto | |
| 5,265,386 A | 11/1993 | Mühlethaler | |
| 5,320,565 A | 6/1994 | Polidori | |
| 5,477,649 A | 12/1995 | Bessert | |
| 5,501,754 A | 3/1996 | Hiraguri | |
| 5,548,932 A | 8/1996 | Mead | |
| 5,566,916 A | 10/1996 | Bailey | |
| 5,616,036 A | 4/1997 | Polidori | |
| 5,632,633 A | 5/1997 | Roosdorp et al. | |
| 5,687,938 A | 11/1997 | Bailey | |
| 5,888,104 A * | 3/1999 | Mello et al. | 439/785 |
| 5,934,818 A | 8/1999 | Schmitt et al. | |
| 5,979,947 A * | 11/1999 | Bushouse | 285/420 |
| 6,040,525 A | 3/2000 | Chauquet et al. | |
| 6,116,969 A | 9/2000 | Piriz | |
| 6,431,502 B1 | 8/2002 | Goodman | |
| 6,463,704 B1 | 10/2002 | Jette | |
| 6,486,402 B2 | 11/2002 | Harger et al. | |
| 6,581,791 B2 * | 6/2003 | Flint et al. | 213/1.3 |
| 6,918,217 B2 | 7/2005 | Jakob-Bamberg et al. | |
| 6,986,673 B2 | 1/2006 | De La Borbolla | |
| 7,168,212 B2 | 1/2007 | Jette | |
| 2004/0172024 A1* | 9/2004 | Gorek | 606/61 |
| 2005/0249571 A1 | 11/2005 | Whipple et al. | |

* cited by examiner

COMMON BONDING NETWORK CLAMP

CROSS REFERENCE TO RELATED APPLICATION

This application is a continuation-in-part of U.S. patent application Ser. No. 12/044,005, filed Mar. 7, 2008, which claims priority from U.S. Provisional Patent Application No. 60/893,713, filed Mar. 8, 2007, the entire disclosure of which is hereby incorporated by reference.

FIELD OF THE INVENTION

The present invention relates to a clamp, and more particularly to a common bonding network clamp for an under floor wiring system.

BACKGROUND OF THE INVENTION

As data centers become more complicated, the utilization of floor space in the data center has become more critical. As a result, common bonding networks have been installed under raised floors. Raised floors are a cost effective and efficient solution for wire and cable management. In the under floor network a bond must be created between the floor pedestal and the common bonding network. The current bonding clamp typically used in under floor wiring systems includes a U-bolt with two threaded ends. The U-bolts are typically secured to floor pedestals by a clamp and various fasteners. The installation of this current bonding clamp, however, is often difficult and time consuming because the fasteners securing the U-bolt must be individually installed to enable the U-bolt to be installed around the floor pedestal. Additionally, to remove the clamp from the floor pedestal, the fasteners must be individually removed from the U-bolt before the clamp may be removed. Thus, it is desirable to provide a common bonding network clamp that creates a bond between the floor pedestal and the common bonding network and that is cost effective and easy to install.

SUMMARY

A clamp is disclosed to create a bond between under floor wiring systems and a common bonding network. The clamp includes a mounting bracket, a J-bolt, or a modified U-bolt, connected to the mounting bracket and a split bolt for securing wires to the mounting bracket. The mounting bracket includes a main body with an aperture and a backside having a slot. The bolt includes a first end attached at the aperture of the mounting bracket and a second end positioned within the slot of the mounting bracket. The second end of the bolt is secured to the mounting bracket by a flange nut. The flange nut is loosened to remove the second end of the bolt from the slot to enable the second end of the bolt to pivot away from the mounting bracket. The bolt receives a floor pedestal to secure the clamp to an under floor wiring system.

DETAILED DESCRIPTION

Figure 1:
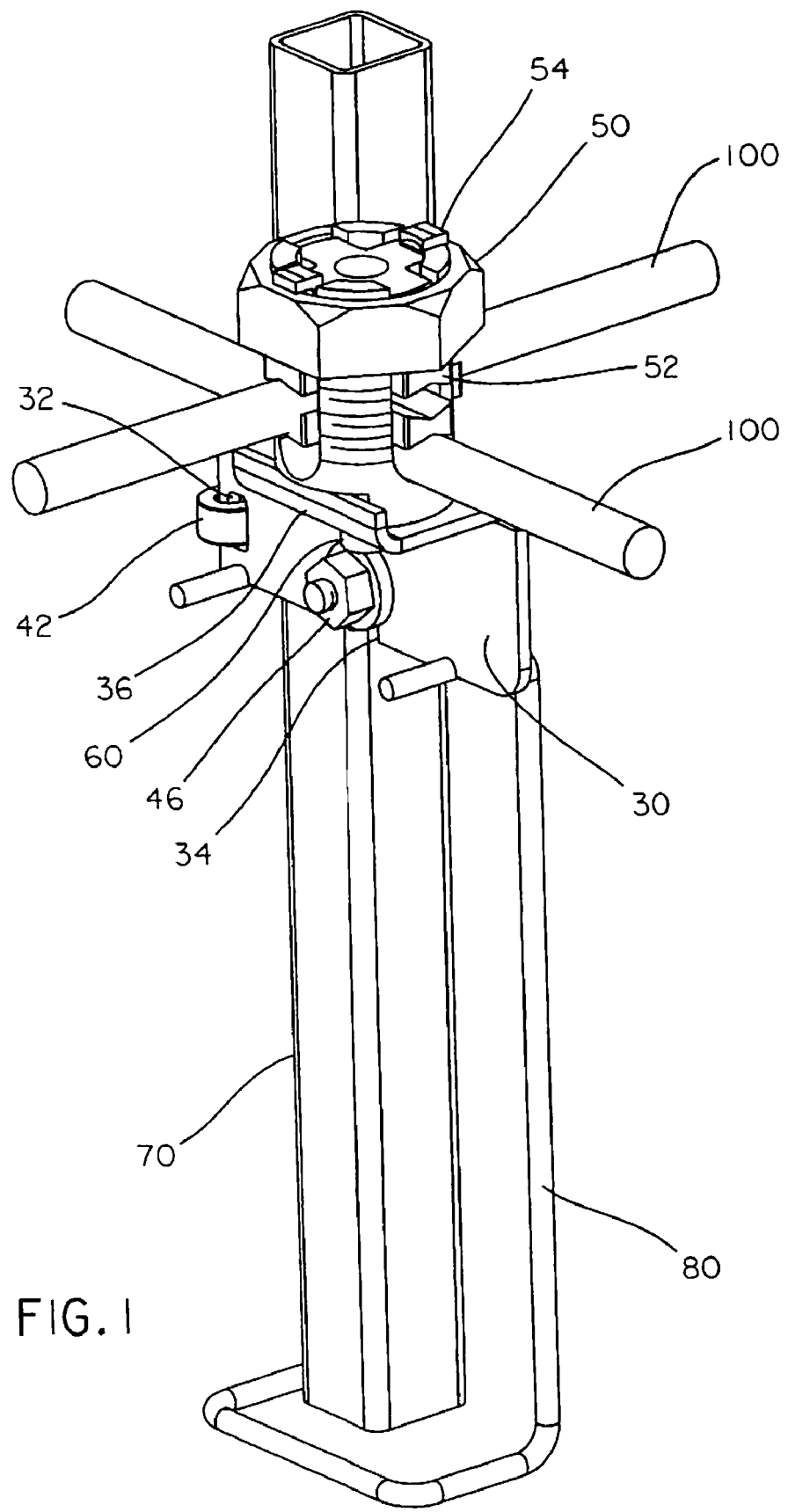
FIG. 1 is a front perspective view of the common bonding network clamp of the present invention secured to an access floor pedestal.

FIGS. 1-9 illustrate the common bonding network clamp 20 of the present invention attached to an access floor pedestal 70 for an under floor wiring system. The common bonding clamp is made of copper to provide a low resistance all copper pathway connection, however, the clamp may be made from other materials. The common bonding network clamp 20 includes a mounting plate 30, a U-bolt 40 and a split bolt 50.

Figure 4:
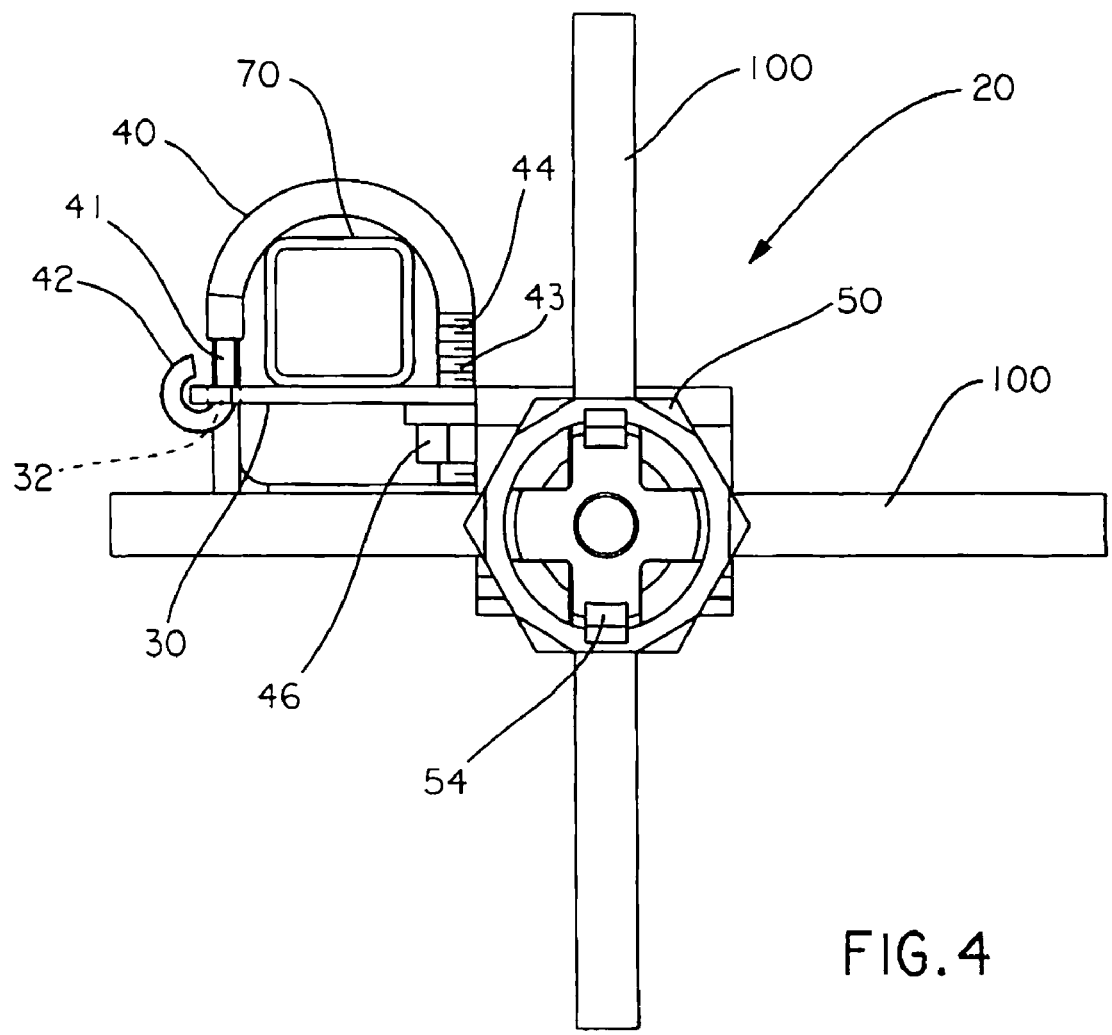
FIG. 4 is a top view of the common bonding network clamp of FIG. 1.
Figure 5:
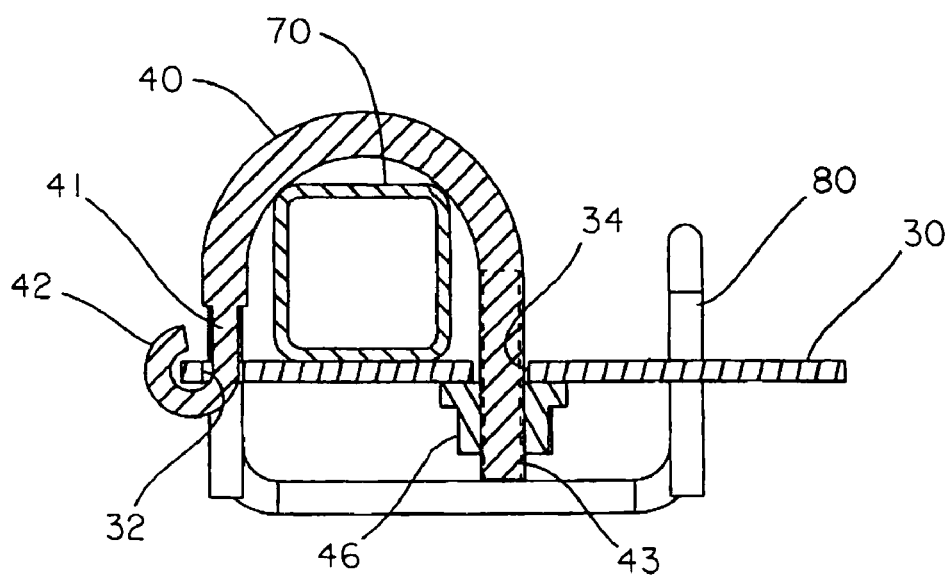
FIG. 5 is a cross sectional view of the common bonding network clamp of FIG. 2 taken along line 5-5.

As illustrated in FIGS. 4 and 5, a first end 41 of the U-bolt 40 includes a hinge 42 and the second end 43 of the U-bolt 40 is threaded 44 for receiving a fastener 46, for example, a serrated flange nut. The mounting plate 30 includes an opening or aperture 32 for receiving the hinge 42 at the first end 41 of the U-bolt 40. The hinge 42 is crimped on the mounting plate 30 to create a captive U-bolt 40. Thus, the U-bolt 40 is pivotally connected to the mounting plate 30 (see FIGS. 7-9). Alternatively, the first end of the U-bolt may be threaded and secured to the mounting plate by a flange nut.

Figure 6:
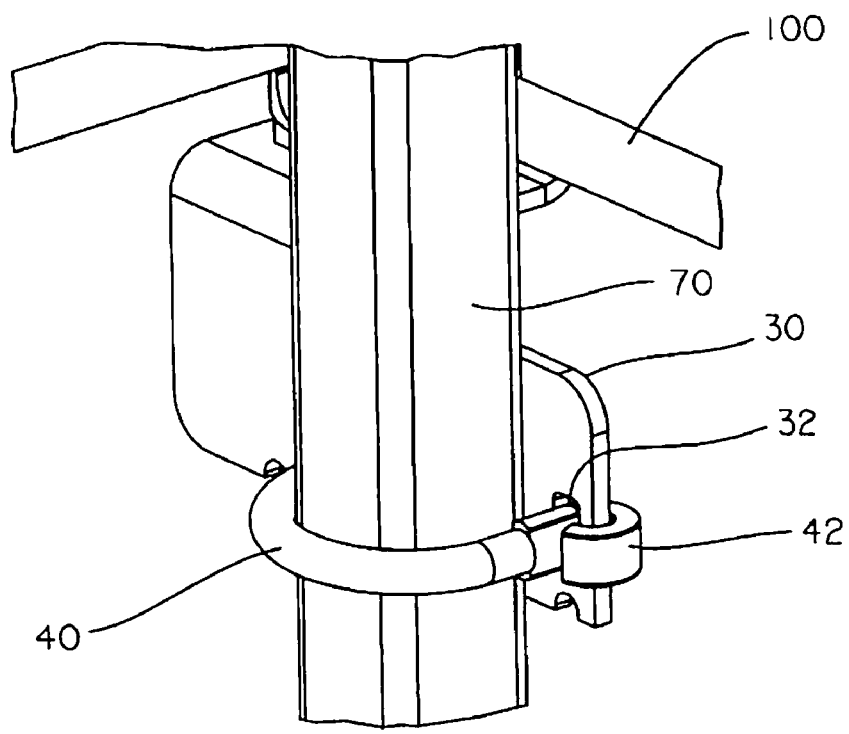
FIG. 6 is a partial rear perspective view of the common bonding network clamp of FIG. 1.
Figure 7:
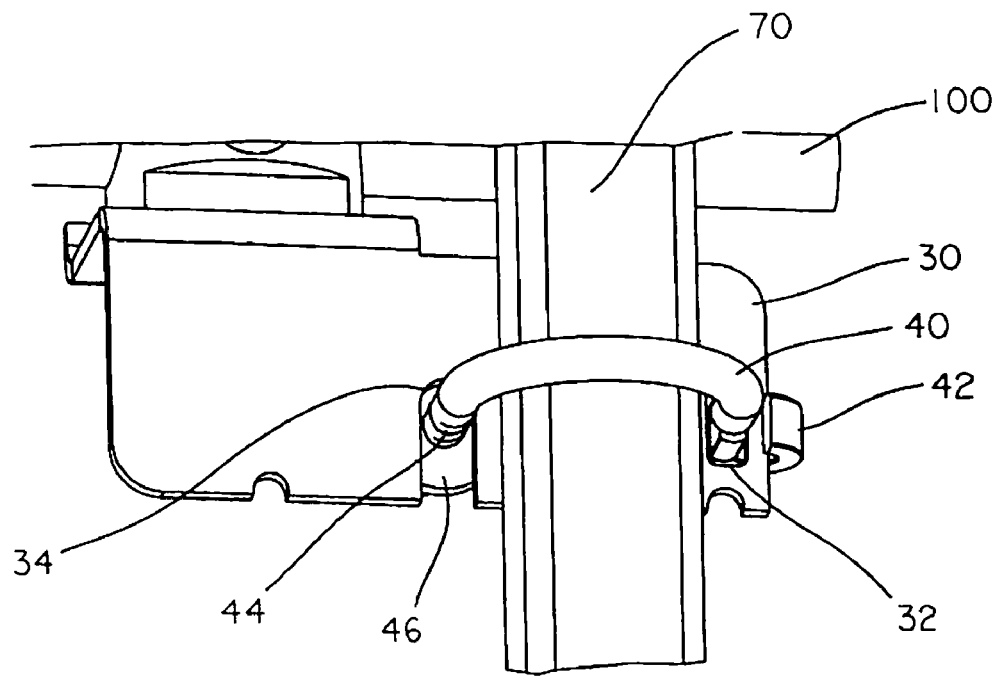
FIG. 7 is a partial rear perspective view of the common bonding network clamp of FIG. 1.
Figure 8:
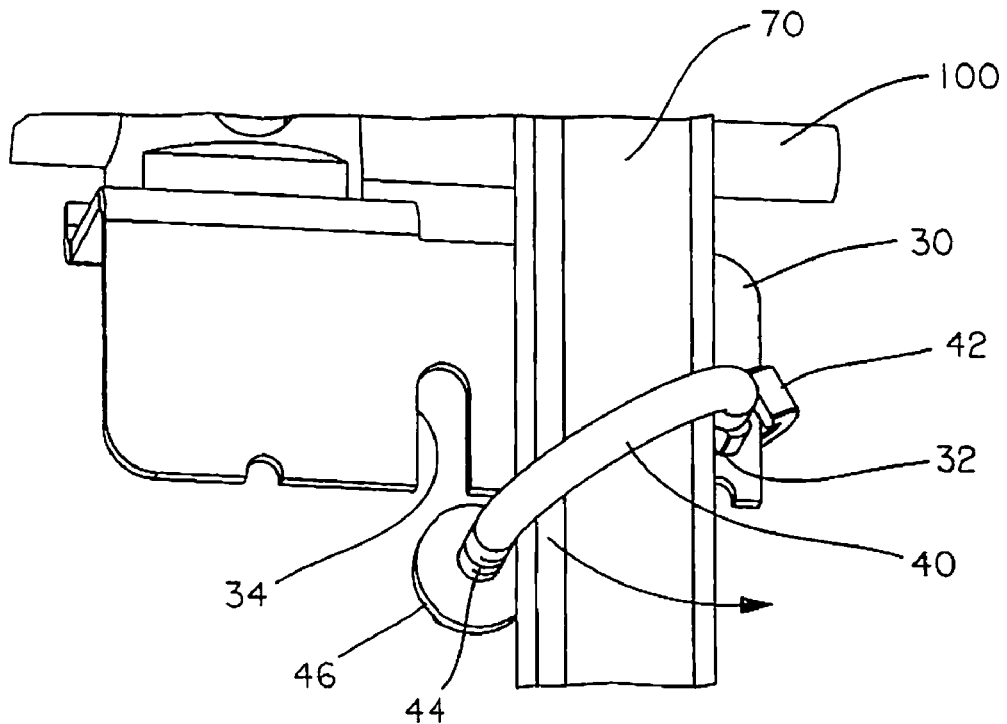
FIG. 8 is a rear perspective view of FIG. 7 with the U-bolt partially rotated from the mounting plate.
Figure 9:
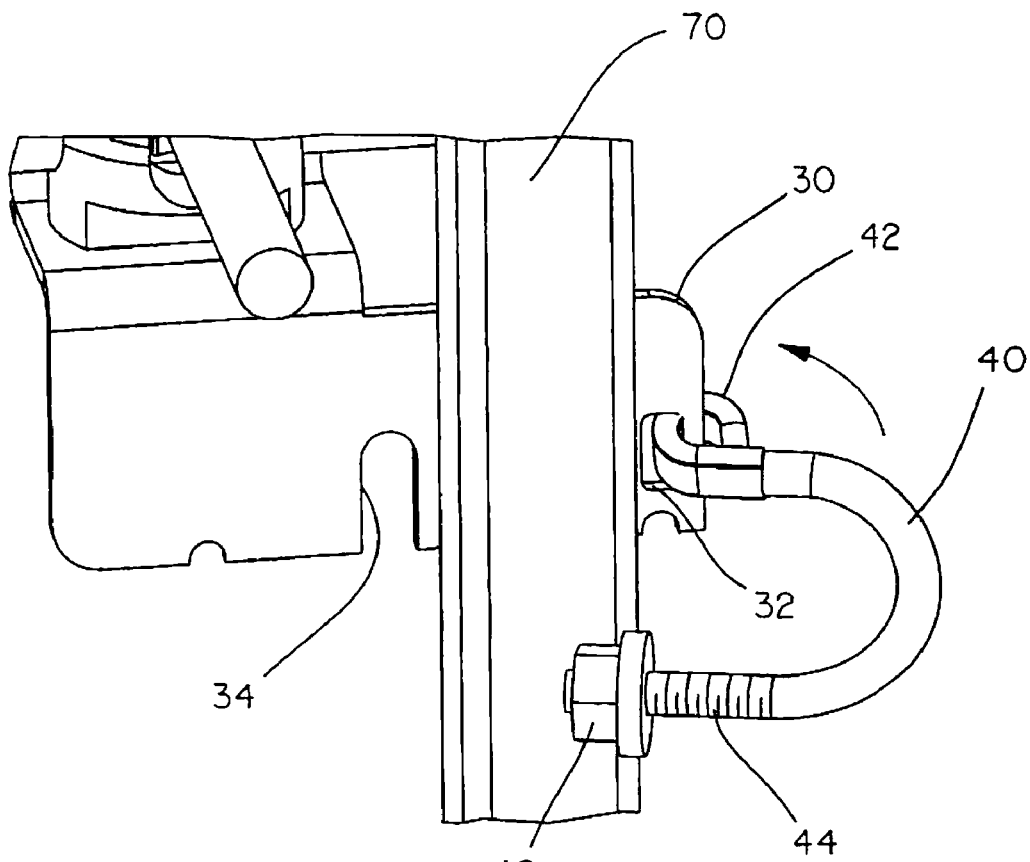
FIG. 9 is a rear perspective view of FIG. 7 with the U-bolt rotated from the mounting plate.
Figure 10:
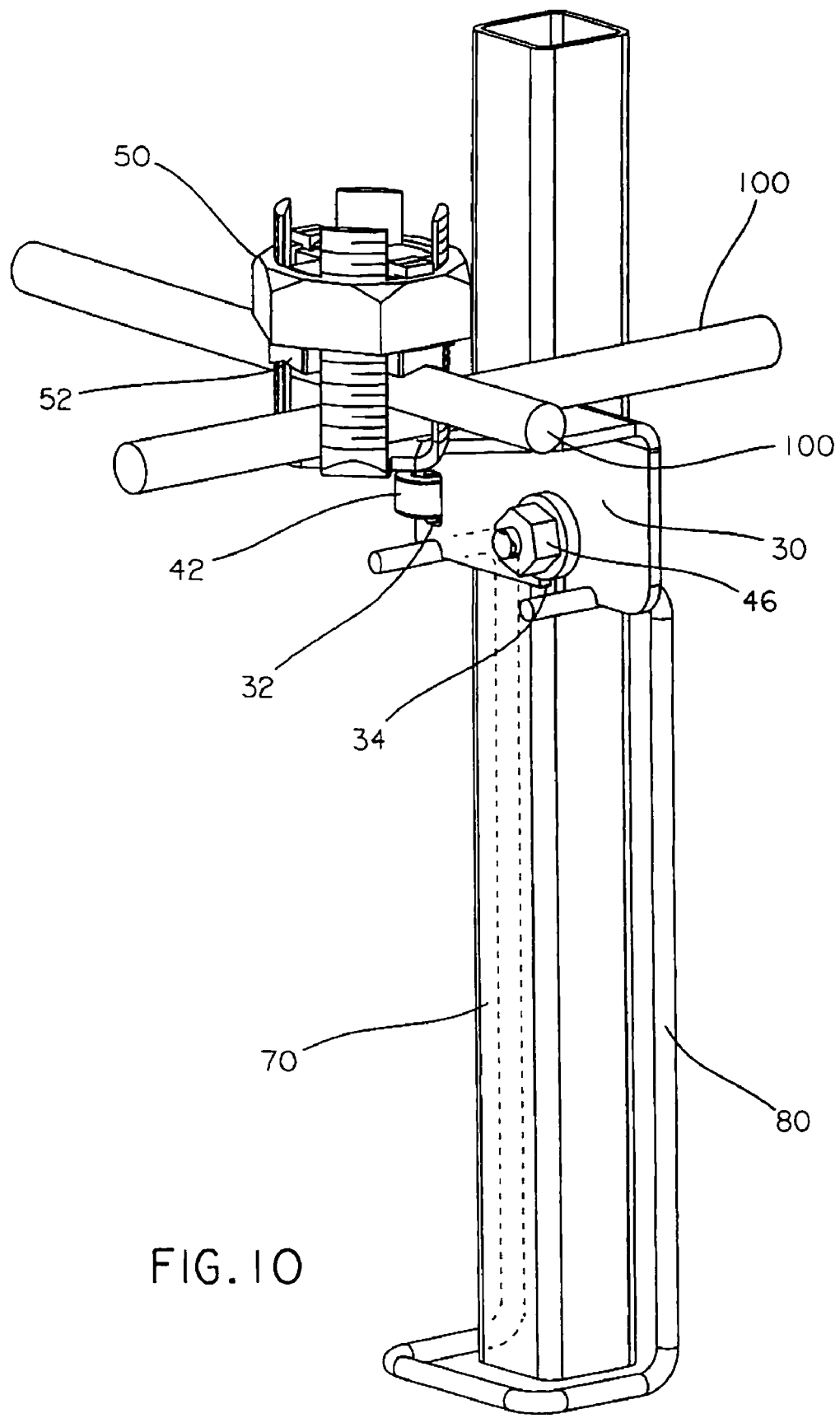
FIG. 10 is a front perspective view of an alternative embodiment of the common bonding network clamp of FIG. 1.
Figure 11:
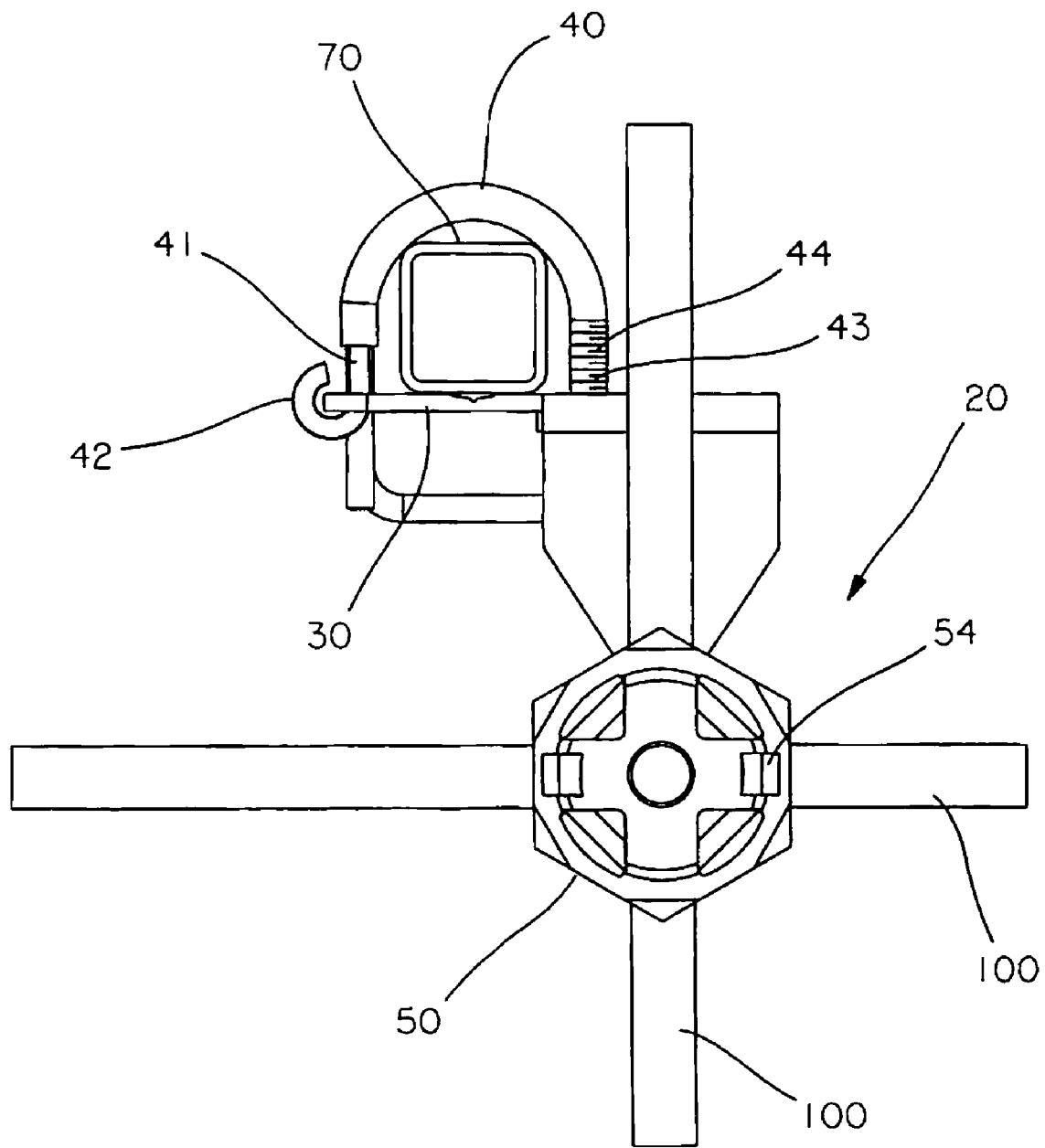
FIG. 11 is a top view of the common bonding network clamp of FIG. 10.
Figure 12:
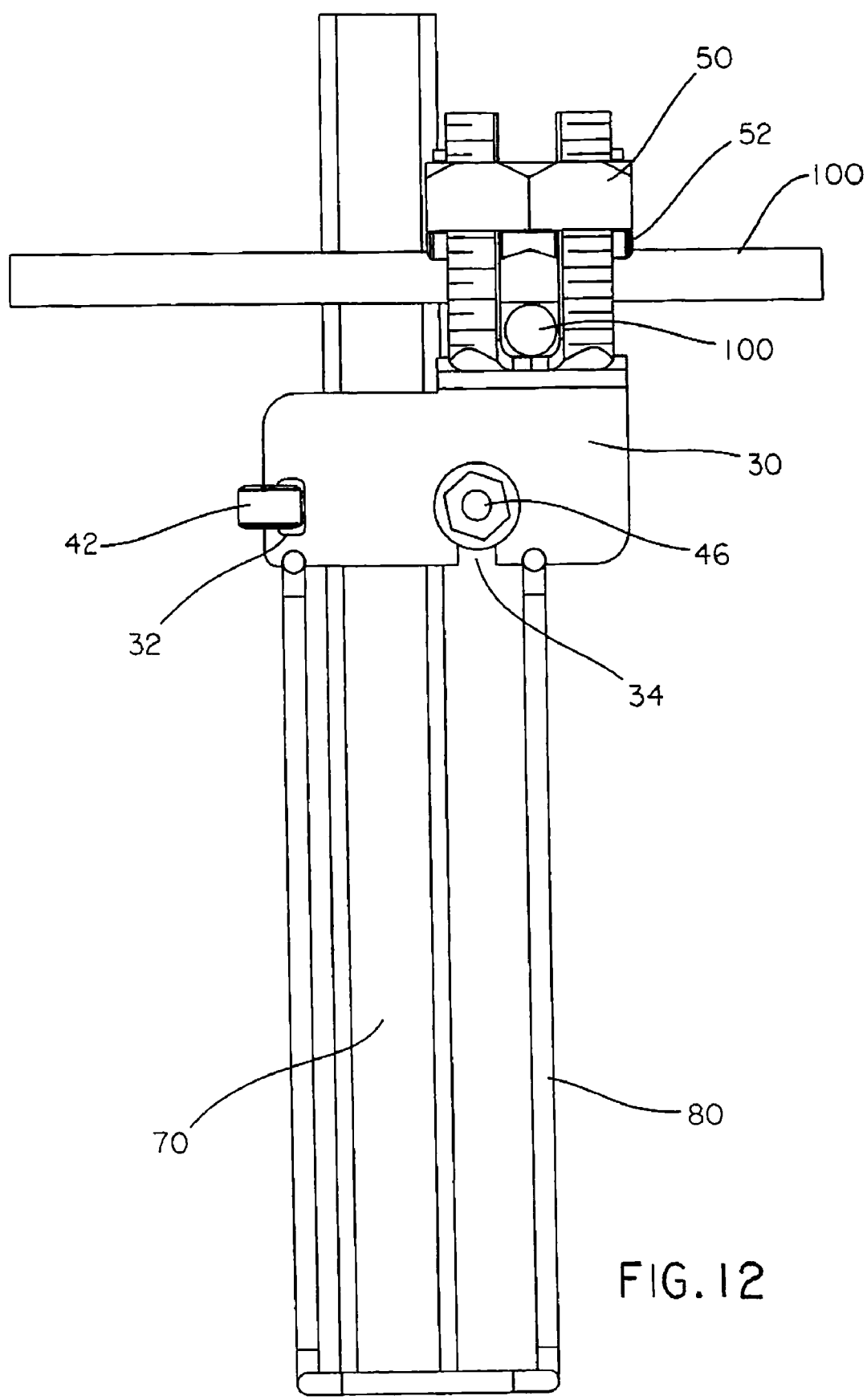
FIG. 12 is a front view of the common bonding network clamp of FIG. 10.
Figure 13:
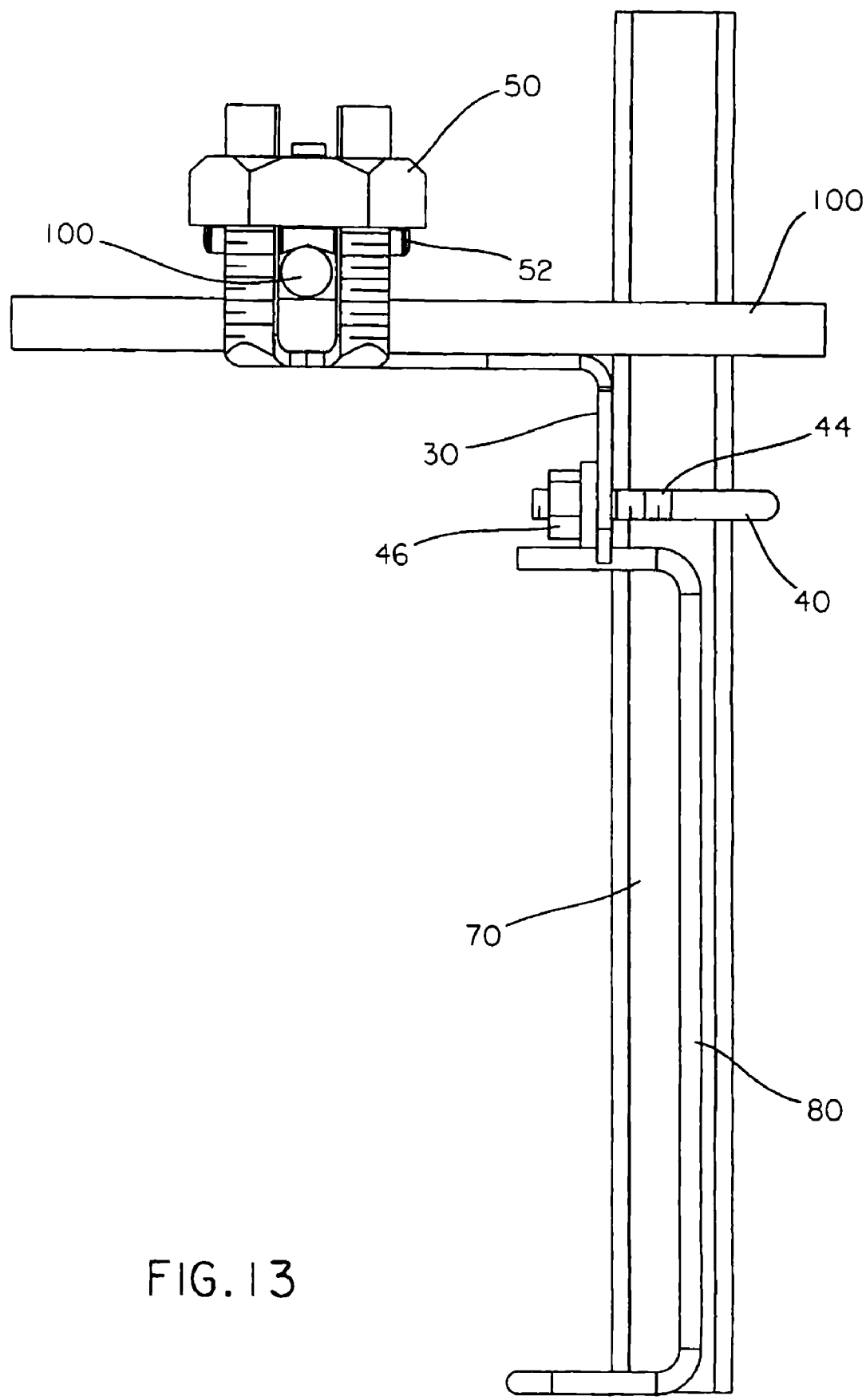
FIG. 13 is a side view of the common bonding network clamp of FIG. 10.

The mounting plate 30 includes a slot 34 (see FIG. 2) that receives the threaded end 44 of the U-bolt 40. As illustrated in FIGS. 6 and 7, when the common bonding network clamp 20 is installed around a raised floor pedestal 70, the U-bolt 40 is positioned around the floor pedestal 70 and the threaded end 44 of the U-bolt 40 is positioned in the slot 34 in the mounting plate 30. A serrated flange nut 46 that has been installed on the threaded end of the U-bolt 40 is tightened to secure the U-bolt 40 to the mounting plate 30. As illustrated in FIGS. 8 and 9, to remove the U-bolt 40, the flange nut 46 is moved along the threaded end until the U-bolt 40 is loose and can pivot away from mounting plate 30 and the floor pedestal 70. Thus, the slot 34 in the mounting plate 30 enables the U-bolt 40 to be quickly installed around the access floor pedestal 70 because the U-bolt 40 may be tightened around the floor pedestal 70 without removing the U-bolt 40 from the mounting plate 30 or without removing the serrated flange nut 46 from the U-bolt 40.

The U-bolt 40 and mounting plate 30 may be secured to access floor pedestals of various shapes and sizes, for example, a floor pedestal that is round or square.

Figure 2:
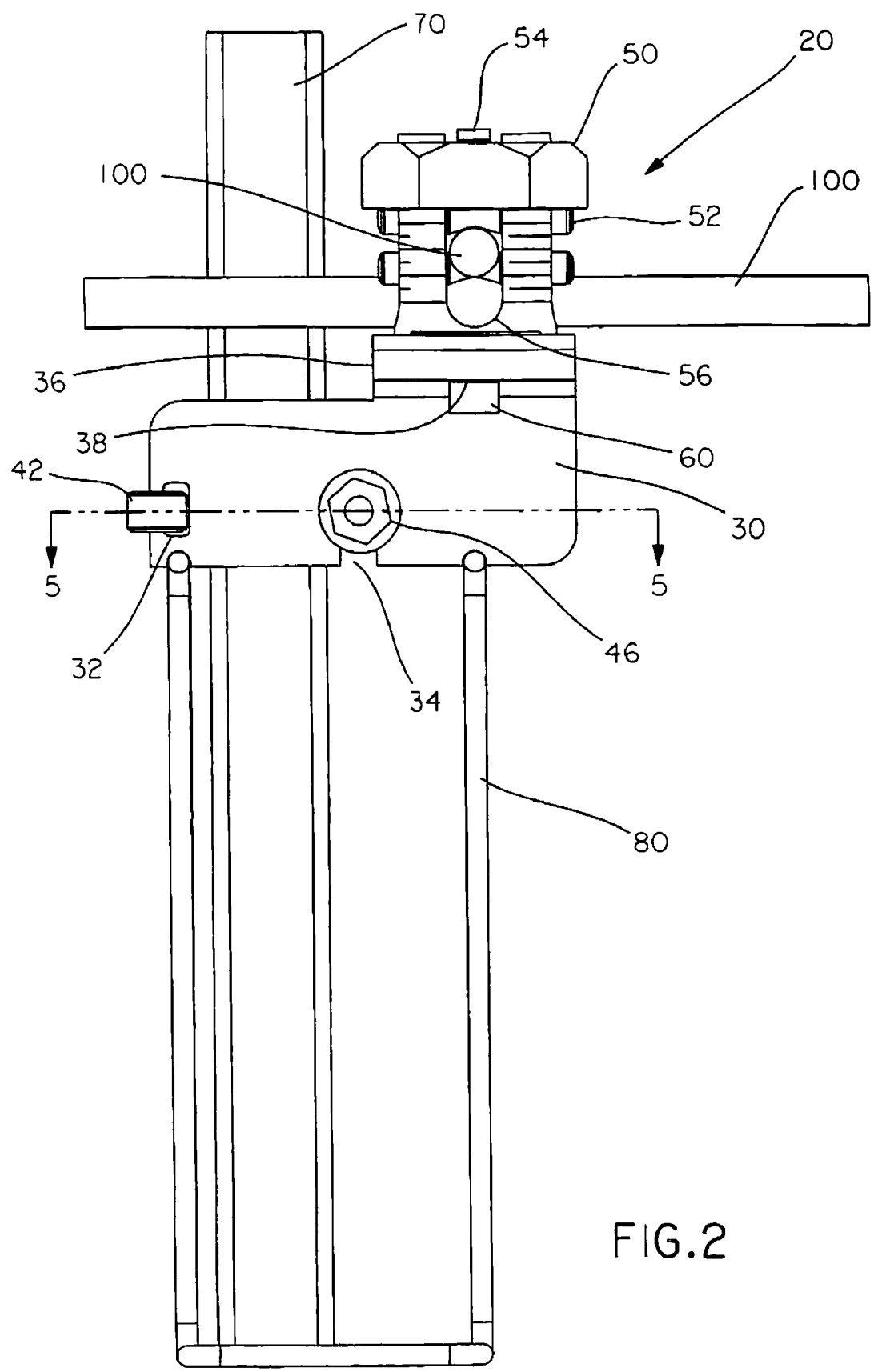
FIG. 2 is a front view of the common bonding network clamp of FIG. 1.
Figure 3:
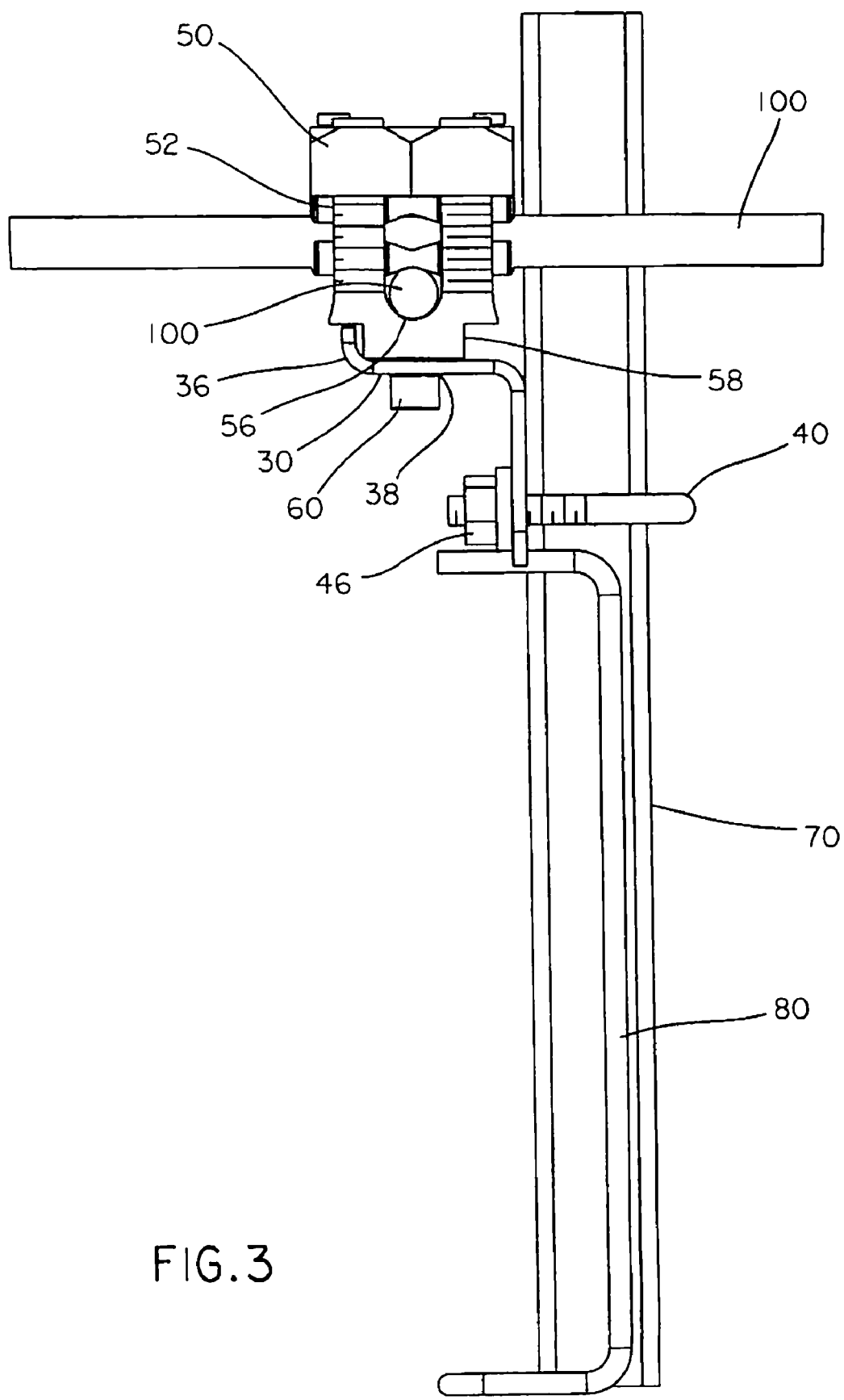
FIG. 3 is a side view of the common bonding network clamp of FIG. 1.

As illustrated in FIGS. 1-3, the mounting plate 30 also includes a lip 36 and an opening or aperture 38 for receiving the split bolt 50. The split bolt 50 is positioned in the opening 38 in the mounting plate 30 and secured thereto via a fastener 60. The mounting plate 30 is designed to space the split bolt 50 from the U-bolt 40 and the attached floor pedestal 70 to enable the split bolt 50 to accommodate the common bonding wires 100.

The split bolt 50 includes a cross-shaped body to enable the bolt to accommodate two perpendicular common bonding wires 100 thereby creating an electrical bond between the wires. The split bolt 50 includes at least one pressure plate 52. The pressure plate 52 is cross-shaped to add strength and reduce deflection or deformation of the split bolt 50 during installation. The cross-shape of the pressure plate 52 also provides grooves to accept the wires 100 to increase the contact surface area and provide a superior electrical bond. The size and shape of the pressure plate 52 may vary to accommodate a range of wire gauges. The top of the split bolt 50 includes a number of bent tabs 54 for securing the pressure plate 52 to the split bolt 50. The split bolt 50 also includes a groove 56 that is designed to accommodate different wire gauges and to increase the contact surface area between the split bolt 50 and the wires 100.

As shown in FIG. 3, the bottom of the split bolt 50 includes a flat area 58. The flat area 58 accepts a standard wrench to facilitate installation of the split bolt 50 to the mounting plate 30. The flat area 58 of the split bolt 50 and the mounting plate lip 36 combine to create an anti-rotation feature.

A freestanding height gauge 80 is used during the installation of the clamp 20. The height gauge 80 insures that all of the clamps 20 in the under floor wiring system are installed at the same height. The clamp 20 creates an electrical bond between the floor pedestal 70 and the wires 100 regardless of the height of the two crossing wires 100. Thus, the freestanding height gauge 80 also facilitates installation of the common bonding network clamps 20.

FIGS. 10-13 illustrate an alternative embodiment of the common bonding network clamp of the present invention. In the alternative embodiment, the split bolt 50 is integrally formed with the mounting plate 30.

Figure 14:
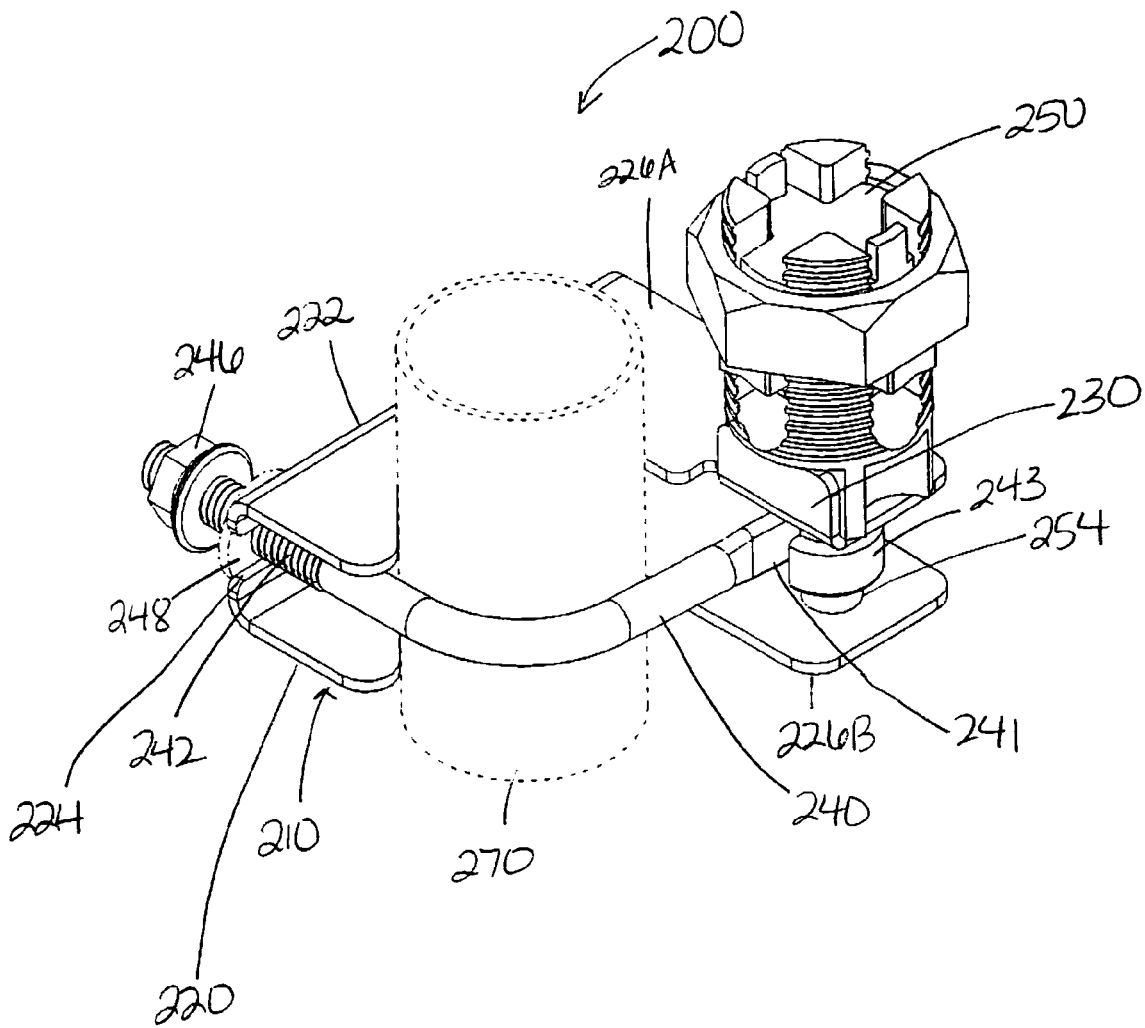
FIG. 14 is a perspective view of an alternative embodiment of the common bonding network clamp for a circular floor pedestal.
Figure 15:
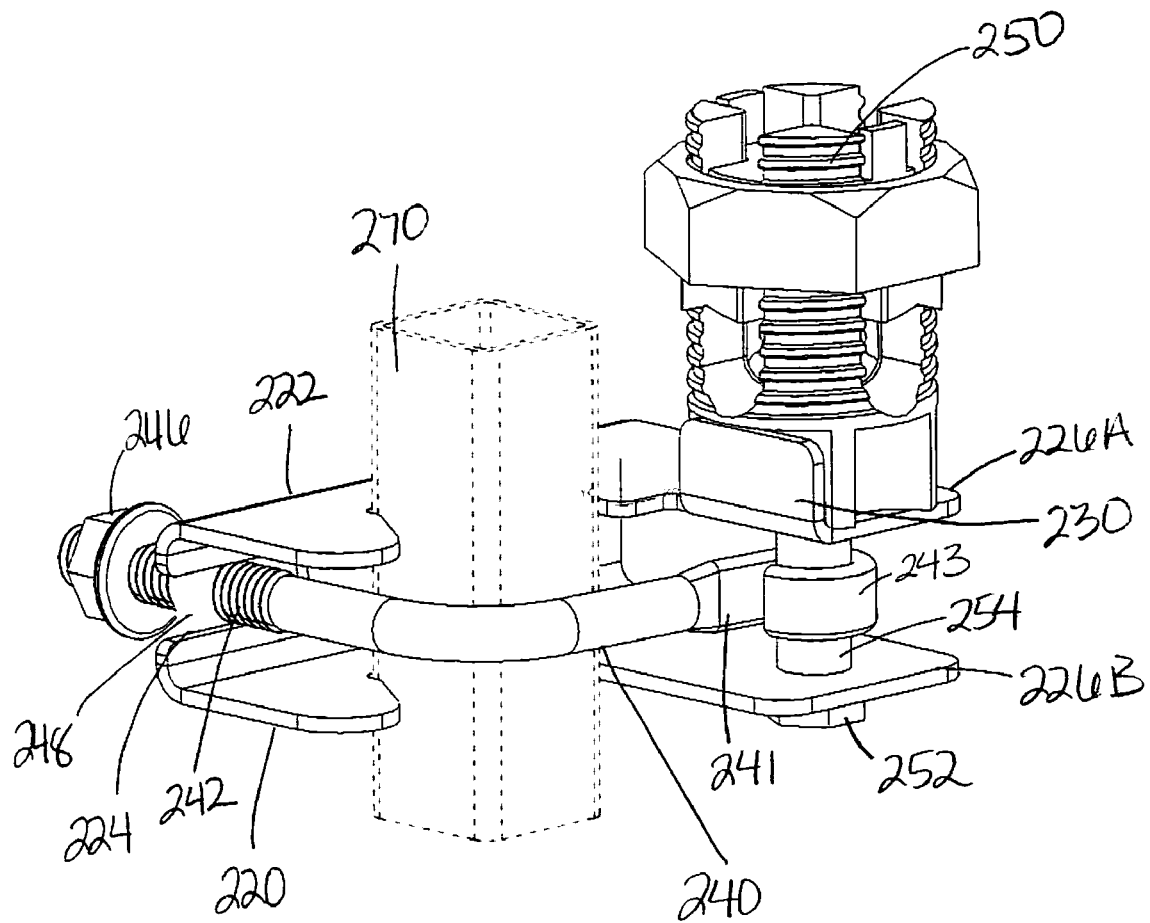
FIG. 15 is a perspective view of the common bonding network clamp of FIG. 14 for a rectangular floor pedestal.
Figure 16:
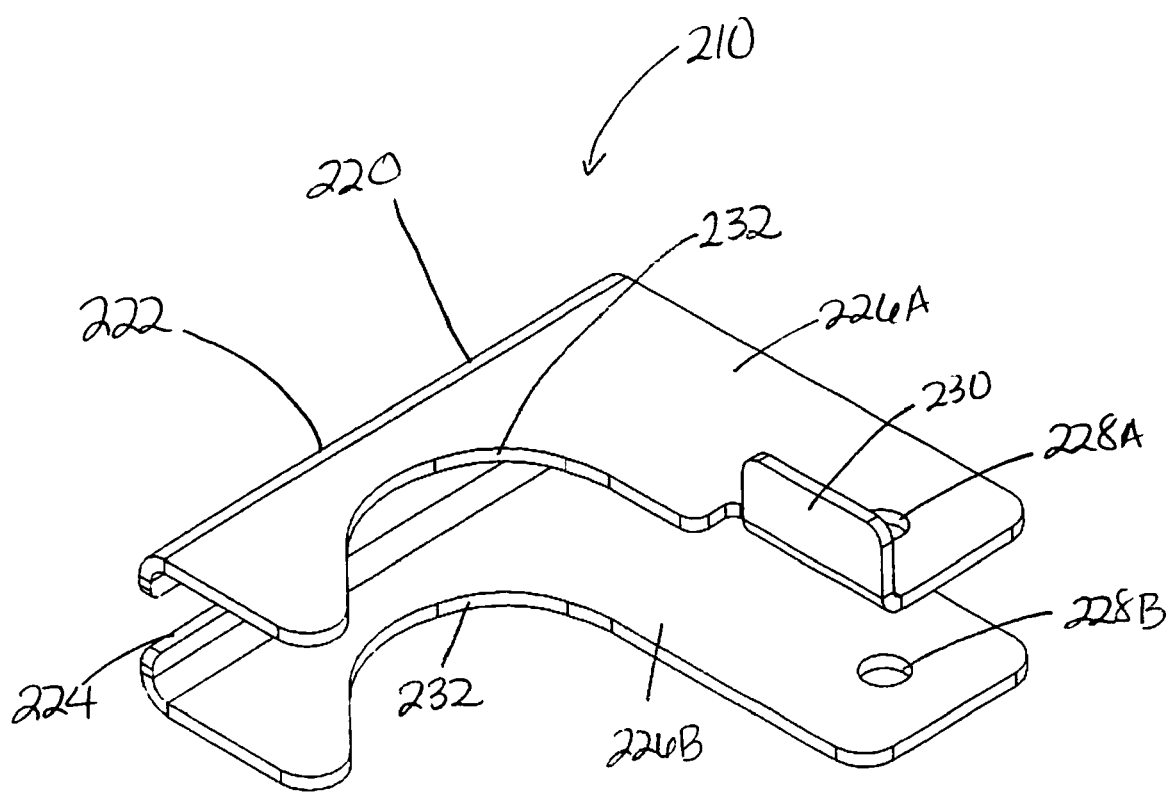
FIG. 16 is a perspective view of the mounting bracket of the common bonding network clamp of FIG. 14.
Figure 17:
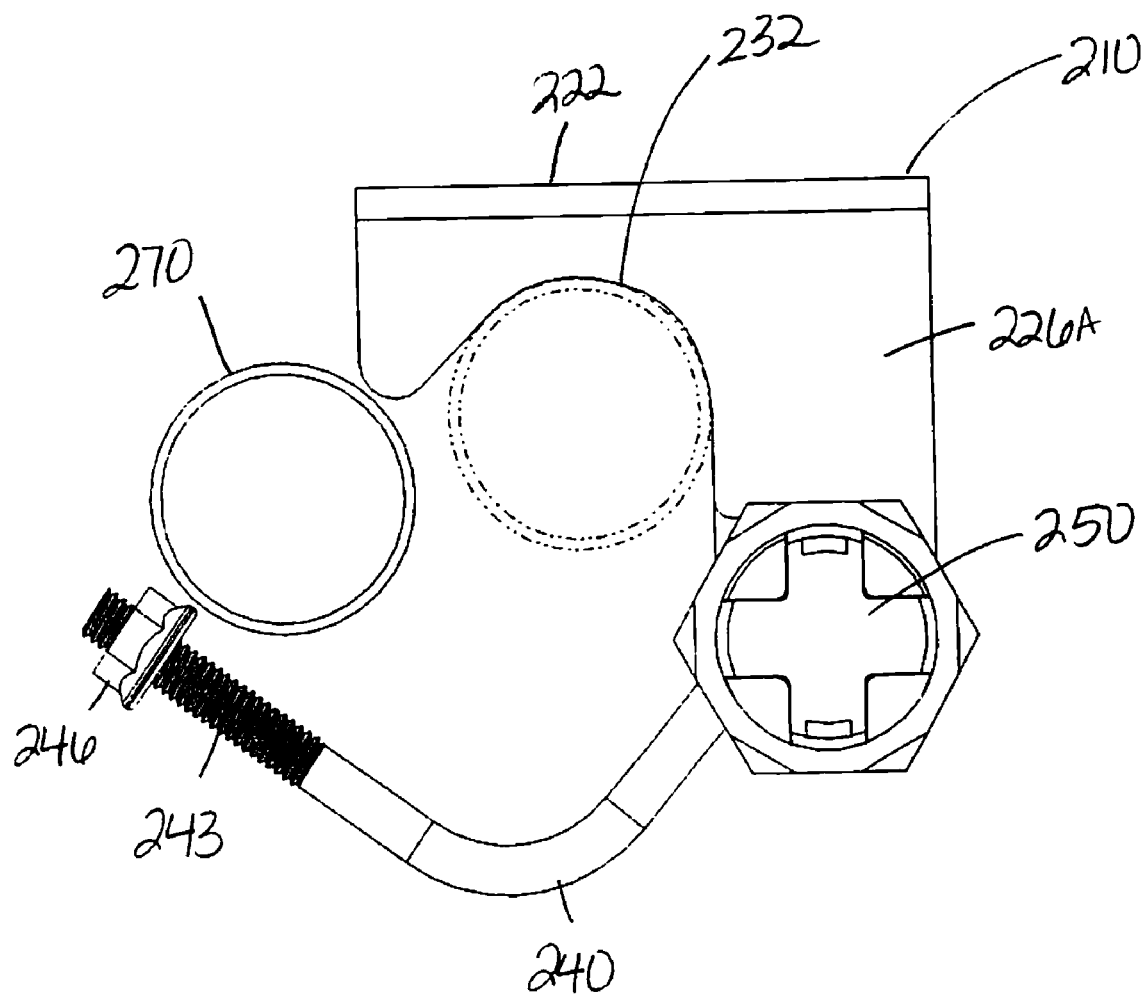
FIG. 17 is a top view of the common bonding network clamp of FIG. 14 with the J-bolt rotated away from the mounting bracket.
Figure 18:
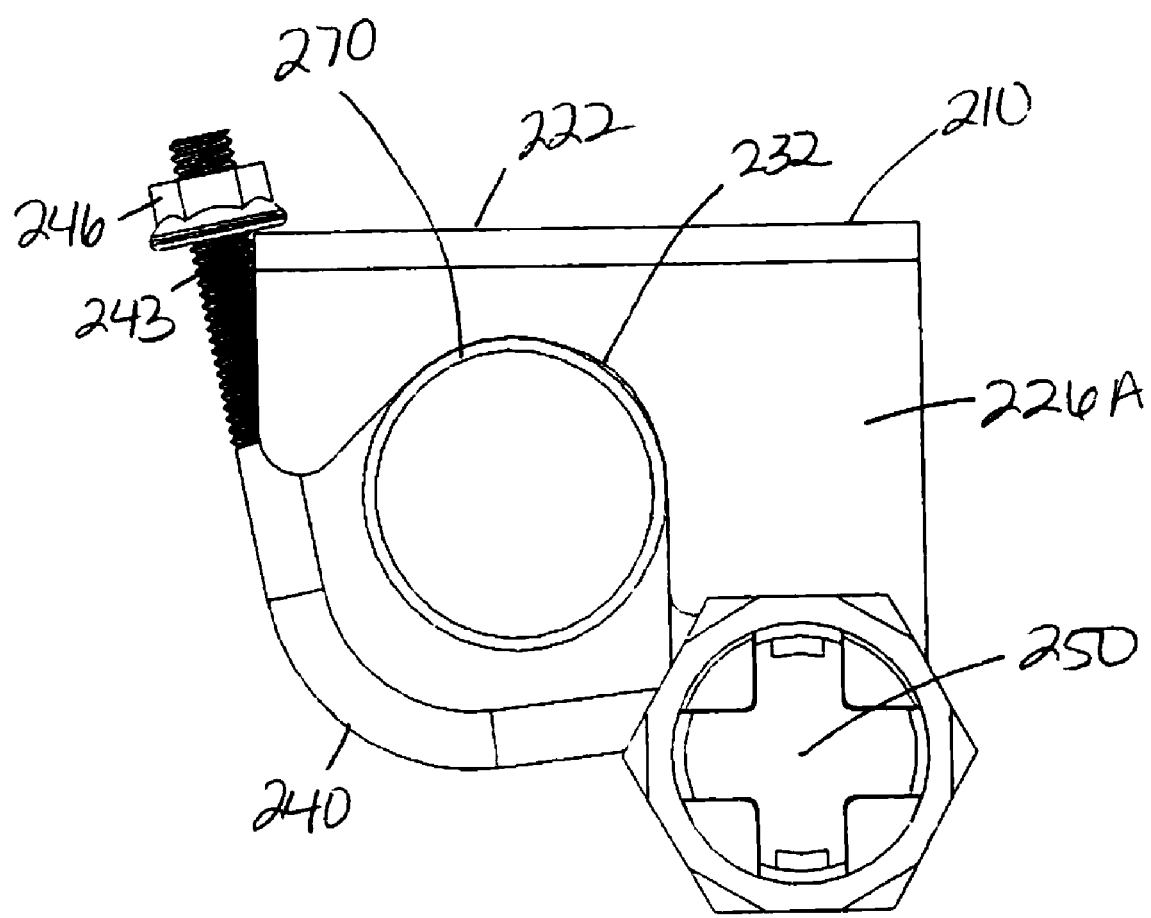
FIG. 18 is a top view of the common bonding network clamp of FIG. 14 with the mounting bracket positioned around a floor pedestal.
Figure 19:
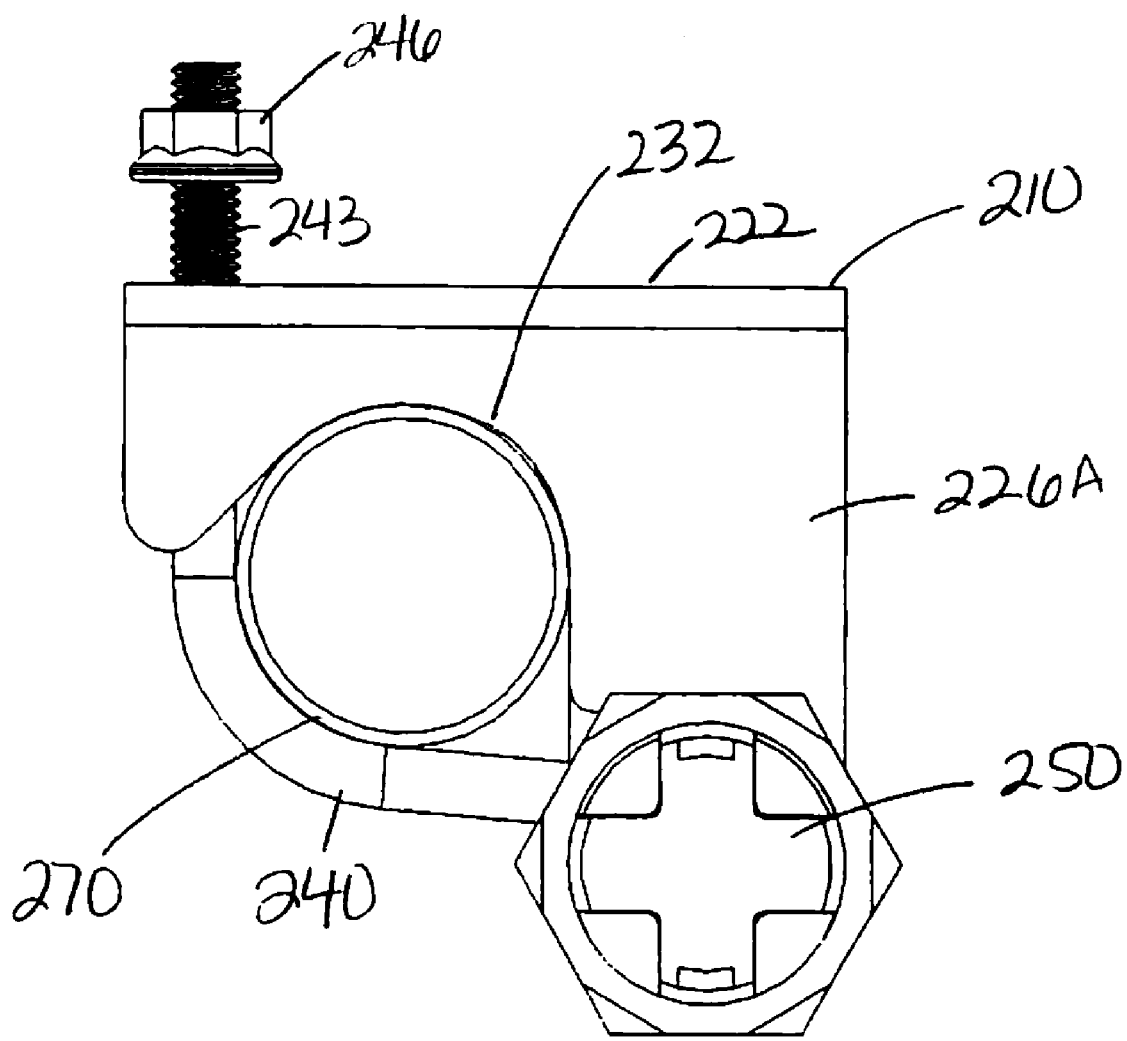
FIG. 19 is a top view of the common bonding network clamp of FIG. 14.
Figure 20:
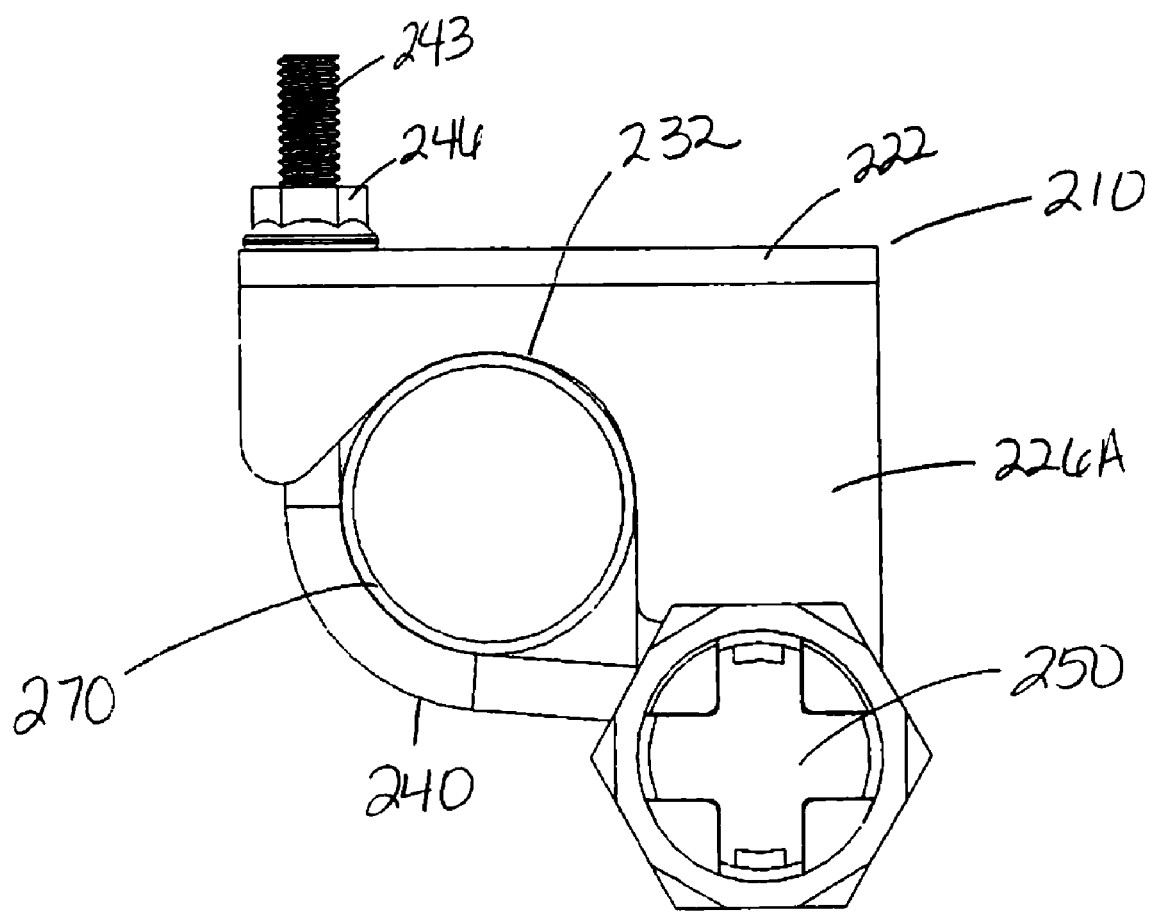
FIG. 20 is a top view of the common bonding network clamp of FIG. 14 with the clamp secured around a floor pedestal.

FIGS. 14-20 also illustrate an alternative embodiment of the common bonding network clamp 200. As shown in FIGS. 14-16, the alternative common bonding network clamp 200 includes a mounting bracket 210 with a pivoting J-bolt 240 or a modified U-bolt.

As described above with respect to the various embodiments of the common bonding network clamp, the J-bolt 240, or modified U-bolt, has a first end 241 and a second end 243. As discussed below, the first end 241 includes a hook 243 that is pivotally secured to the mounting bracket 210. The second end 243 is threaded and receives a common hex nut 246 or a serrated flange hex nut.

The mounting bracket 210 includes a main body 220 with a backside 222 and two parallel wings 226A, 226B that extend from the main body 220. The main body 220 includes partial circular cut-out portions 232 (see FIG. 14) or rectangular cut-out portions (see FIG. 15) to facilitate placing the bracket 210 around a floor pedestal 270. The upper wing 226A includes a vertical flange 230 to ensure positive orientation of an electrical connector 250 attached thereto. Each wing 226A, 226B includes an aperture 228A, 228B or a hole near the end. The electrical connector 250, i.e. split bolt, is attached to the wings 226A, 226B at the holes 228A, 228B by a fastener, such as a serrated head screw 252 and a spacer sleeve 254. As illustrated in FIG. 15, the first end 241 of the J-bolt 240 is hooked around the fastener 252 and is positioned between the spacer sleeve 254 and the wings 226A, 226B. As a result, the first end of the J-bolt is pivotally secured to the mounting bracket enabling the second end to pivot away from the mounting bracket to install the clamp around the floor pedestal.

The backside 222 of the mounting bracket 210 includes a slot 224 for receiving the second end 243 of the bolt 240.

FIGS. 17-20 illustrate the installation of the clamp 200 around a floor pedestal 270. The mounting bracket 210 is placed around the floor pedestal 270 and the J-bolt 240 is pivoted towards the mounting bracket 210. The second end 243 of the J-bolt 240 is positioned in the slot 224. Once the J-bolt 240 is fully inserted in the slot 224, the hex nut 246 is tightened to secure the mounting bracket 210 to the floor pedestal 270. If desired, a washer 248 may also be used with the common hex nut 246. If a serrated flange hex nut is used, a washer is not required. As described above, to remove the clamp 200 from the floor pedestal 270, the nut 246 is moved along the J-bolt 240 a certain distance to enable the J-bolt 240 to pivot away from the backside 222 of the mounting bracket 210. Once the second end 243 of the J-bolt 240 pivots from the backside 222 of the mounting bracket 210 and the floor pedestal 270, the clamp 200 may be moved away from the floor pedestal 270.

Furthermore, while the particular preferred embodiments of the present invention have been shown and described, it will be obvious to those skilled in the art that changes and modifications may be made without departing from the teaching of the invention. The matter set forth in the foregoing description and accompanying drawings is offered by way of illustration only and not as limitation.

The invention claimed is:

1. A clamp comprising:
a mounting bracket having a main body with an aperture and a slot, wherein the main body of the mounting bracket includes a backside and two parallel wings, wherein one of the wings includes a flange extending vertically from the wing, a split bolt connected to the mounting bracket for securing wires to the mounting bracket, wherein the flange ensures a positive orientation of said split bolt attached to the mounting bracket; and
a bolt connected to the mounting bracket, wherein the bolt is disposed along a plane and has a first end and a second end, the first end is attached at the aperture of the mounting bracket and the second end is positioned within the slot in the mounting bracket; wherein the split bolt extends in a plane traversing the plane of the bolt.

2. The clamp of claim 1, wherein the slot is in the backside of the mounting bracket.

3. The clamp of claim 1, wherein the main body of the mounting bracket receives a floor pedestal to secure the clamp to an under floor wiring system.

4. The clamp of claim 1, wherein at least one of the first and second ends of the bolt is threaded.

5. The clamp of claim 1, wherein the second end of the bolt is secured to the mounting bracket by a flange nut.

6. The clamp of claim 1, wherein the second end of the bolt pivots away from the slot in the mounting bracket.

* * * * *